June 27, 1950

C. E. JONES 2,513,265

CRAWLER TREAD ADJUSTING DEVICE

Filed July 5, 1945

INVENTOR
Cecil E. Jones
BY
Symmestead & Lehmer
ATTORNEYS

June 27, 1950 C. E. JONES 2,513,265
CRAWLER TREAD ADJUSTING DEVICE
Filed July 5, 1945 2 Sheets-Sheet 2
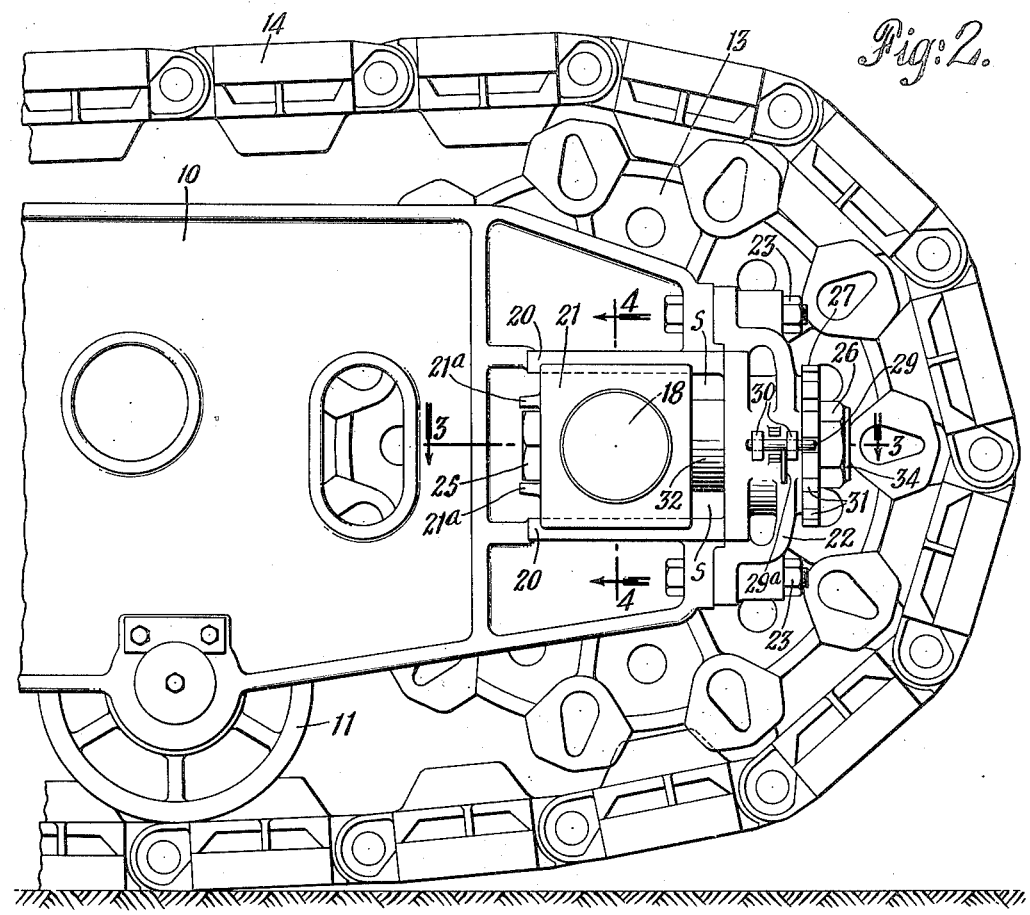
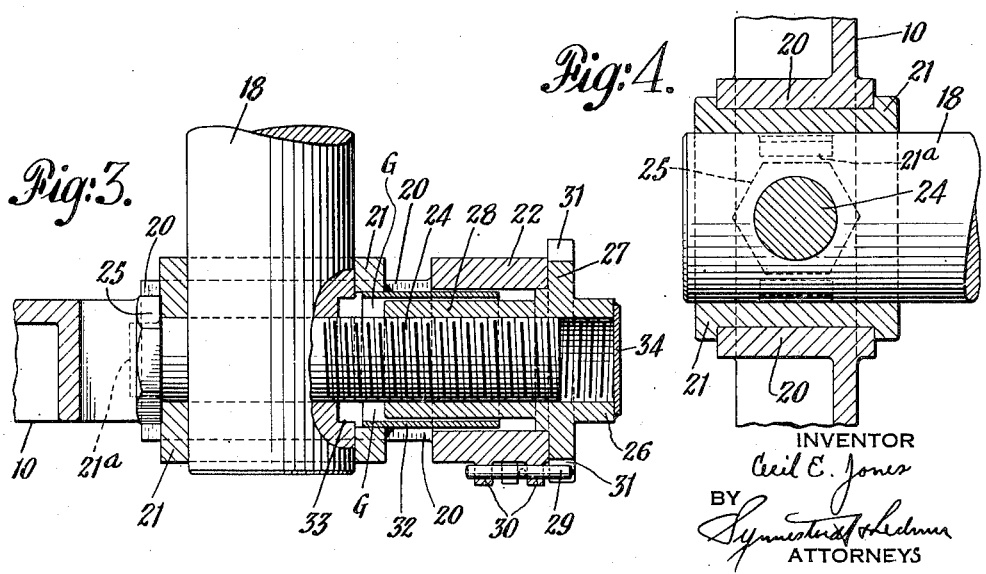
INVENTOR
Cecil E. Jones
BY
ATTORNEYS Patented June 27, 1950

2,513,265

UNITED STATES PATENT OFFICE 2,513,265

CRAWLER TREAD ADJUSTING DEVICE

Cecil E. Jones, Lima, Ohio

Application July 5, 1945, Serial No. 603,295

8 Claims. (Cl. 305—9)

This invention relates to crawler treads, particularly to such treads as employed to support and propel load handling machines such, for example, as cranes, shovels and the like.

The primary object of the invention is the provision of an improved form of tread adjusting mechanism adapted to take up slack in the tread introduced as a result of wear in the tread itself or in the rollers or sprockets associated therewith.

The treads of crawler trucks are quite commonly required to travel on muddy ground and, for this, and other reasons, the tread and the rollers associated therewith are subject to contact with considerable dirt, grit, etc. With this in mind, the invention provides a slack take-up or tread-adjusting mechanism, the operating parts of which are all thoroughly and effectively shielded as against ingress of or contact with mud or other dirt.

The invention also contemplates a novel adjustable mount for th tread rollers in the crawler truck, which mount is of sturdy construction so as to be capable of withstanding the heavy loads encountered in heavy load handling equipment.

Still further, the adjusting mechanism according to the invention is arranged for ease of adjustment and ready access at the side of the crawler truck and tread, while at the same time the parts of the adjusting mechanism which might be chiefly affected by dirt remain shielded therefrom.

How the foregoing objects and advantages are attained will appear more fully from the following description referring to the accompanying drawings in which—

Figure 2 is an enlarged elevational view of one end portion of a crawler truck frame, showing a tread driving roller adjustably mounted in the frame and cooperating with the tread;

Figure 3 is a fragmentary plan section through the adjustable roller mounting mechanism, this view being taken as indicated by the line 3—3 on Figure 2, but being on a further enlarged scale; and Figure 4 is a fragmentary vertical sectional view taken as indicated by the line 4—4 on Figure 2, this view also being on an enlarged scale as compared with Figure 2.

Figure 1:
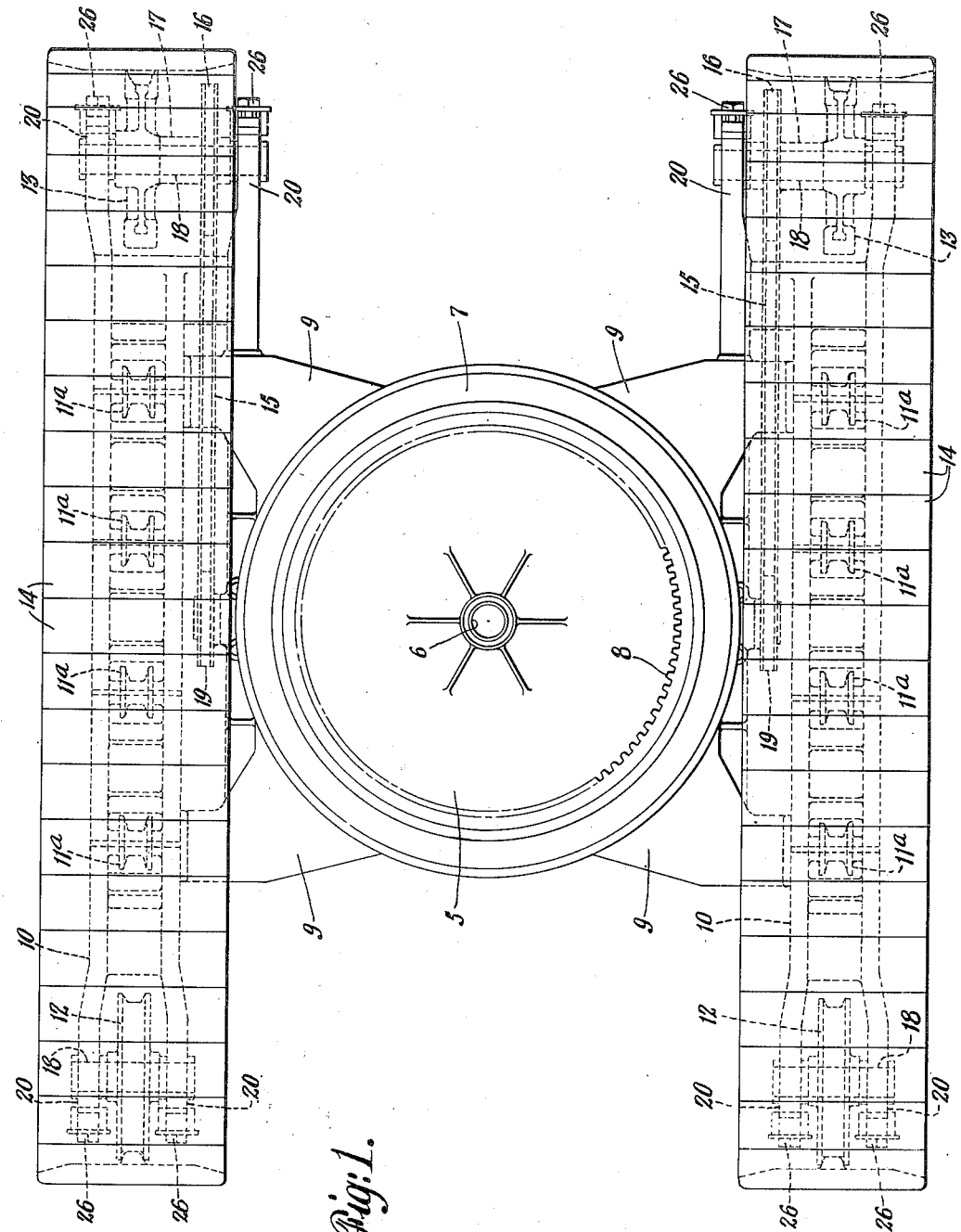
Figure 1 is a plan view of a crawler truck with a pair of crawler treads associated therewith mounted and arranged in accordance with the invention.

The crawler truck structure, as shown in Figure 1, includes a central portion 5 having a central shaft receiving bearing 6 defining the center of swing motion of the machine adapted to be mounted on the truck. A circular track 7, concentric with the central shaft, is provided for cooperation with main and hook rollers carried by the rotating base of the superimposed machine, the rollers serving to transmit loads to the track 7 and therethrough to the truck. An internal ring gear 8 is arranged inwardly of the circular track 7 to cooperate with a drive pinion mounted on the rotating base of the machine and adapted to be rotated for the purpose of effecting swing motion of the rotating base with relation to the truck.

The truck structure further includes pairs of laterally projecting arms or supports 9 to which longitudinally extending truck framing 10 is connected.

Intermediate its ends, the frame structure at each side of the machine serves to carry a series of rollers 11, one of which appears in Figure 2, adapted to ride on the tread links 14 and transmit the load of the machine thereto. Another series of rollers 11a is mounted in the frame under the top run of the tread links to prevent excessive sagging of the tread. At each side, moreover, the frame structure carries relatively large diameter rollers 12 and 13 adjacent the ends, around which the tread links 14 pass as the links move from the lower run of the tread to the upper run, or vice versa. The details of the formation of the drive roller 13, shown in Figure 2, need not be considered herein, since they form no part of the present invention per se and since a generally similar drive roller is disclosed in Artz Patent No. 2,302,658.

Each of the drive rollers 13 is adapted to be driven by a chain 15 cooperating with a sprocket 16, the sprocket and roller 13 being interconnected by a sleeve 17. The interconnected roller 13, sprocket 16 and sleeve 17 are rotatively mounted on a transverse shaft 18 which is adjustably carried in the frame 10 in the manner described herebelow.

Before describing the adjusting mechanism, it is mentioned that chain 15 is adapted to be driven by a sprocket 19 carried on a shaft extending into the central portion of the truck structure. As is customary in load handling equipment, the two transverse drive shafts are arranged to be clutched to a vertical shaft disposed coaxially of the axis of swing motion (the axis of the central aperture 6), the vertical shaft being extended upwardly to the superimposed rotating base of the machine mounted on the truck. The vertical drive shaft for the crawler treads is ordinarily driven from an engine carried by the rotating base of the machine, but, since these parts form no part of the present invention per se, they need not be considered in detail herein. A crawler tread drive mechanism suitable for the purpose is disclosed in copending application of William M. Huston and Cecil E. Jones, Serial No. 454,792, which issued on October 23, 1945, as Patent No. 2,387,268.

Referring now particularly to Figures 2, 3 and 4, it will be seen that the frame structure 10 is provided adjacent the end thereof with pairs of horizontally extending jaws 20 forming a horizontal guideway for the flanged shaft-supporting block 21. When viewed as in Figure 1, a pair of jaws of the type just mentioned extends from the inner edge of frame 10 (at the inner side of the sprocket 16), another such pair extending at the outer side of the roller 13. The roller supporting shaft 18 is thus provided with a broad base of support in the frame structure. Similar jaws project at the opposite end of the frame at each side of the idler roller 12.

Each of the several pairs of jaws is closed at its outer end by a binder such as indicated at 22 in Figure 2, the binder being secured to the frame by bolts 23. Adjustment of the shaft supporting blocks 21 in the pairs of jaws (and thus adjustment of shaft 18 and the roller carried thereby) is effected by means of a threaded shaft or bolt 24 (see particularly Figure 3) positioned with its head 25 at the inner side of box 21 and extended through apertures in the box 21, shaft 18, and binder 22, for cooperation with an internally threaded adjusting nut 26. The bolt-head 25, when in assembled position, is kept from turning by means of lugs 21a. The nut 26 has a flange 27 adapted to bear against the surrounding portion of the binder 22, so that upon tightening of the nut, the shaft supporting-block 21 and the shaft 18 are drawn forwardly toward the binder 22.

From examination of Figure 3, it will be seen that the adjusting nut 26 is provided with an internally threaded sleeve-like extension 28 of substantial length. This serves the three-fold purpose of providing a large area of thread engagement to withstand the heavy thrusts involved, providing a substantial part of the enclosure for the bolt 24 so as to retain lubricant and exclude dirt, and providing for a substantial range of adjustment without the necessity of having the bolt protrude exteriorly of the nut where it might be fouled or damaged. The latter advantage makes it possible to seal the opening in the nut, as hereinafter described. The nut is adapted to be secured in any adjusted position by means of a pin 29 carried in a pair of apertured lugs 30 formed on the pedestal binder 22, and itself held by another pin 29a. The outwardly projecting end of the pin 29 is adapted to engage in any one of a series of notches 31 formed in the periphery of the nut flange 27. When it is desired to make an adjustment, the pin 29a is lifted and the pin 29 then slid lengthwise until disengaged from notch 31. After an adjustment has been made, pin 29 is returned into engagement with one of the notches 31, and gravity may then be relied upon to retain the pin 29a in depending position, in which sliding of the pin 29 is prevented.

For the purpose of protecting the threads of the adjusting bolt 24, and preventing ingress of dirt, in the region (marked S in Fig. 2) between the shaft supporting block 21 and the binder 22, a cylindrical shield or sleeve 32 is arranged to telescope with the nut. In the preferred arrangement the sleeve 32 telescopes with the threaded extension or sleeve 28 of the nut 26. The sleeve 32 is welded to the shaft supporting block 21 which slides between the jaws 20 and thus the threaded extension 28 of the nut 26 moves into or out of the sleeve 32 when an adjustment is made. The shaft 18 is recessed at 33 to accommodate the threaded extension 28 of the nut toward one limit of the range of adjustment. It will also be noted from Figure 3 that the outer end of sleeve 32 projects into the central aperture formed in the pedestal binder 22, there being relatively close clearance between the sleeve 32 and the pedestal binder and also between the sleeve 32 and the threaded sleeve 28, so that ingress of dirt to the threads of screw 24 is substantially obviated.

In the preferred arrangement, the axial dimension of the nut 26 with its connected sleeve 28 is so proportioned with relation to the range of adjustment required, that in no position of adjustment does the screw 24 project outwardly beyond the outer end of nut 26. This is of importance from the standpoint of protection of the screw threaded parts from injury and from contact with dirt. Moreover, when arranged in this way it is preferred to close the outer end of the nut by means of a plate 34 which completely obviates ingress of dirt to the screw parts from the outer end of the nut. Grease can be packed in the space G to protect the threads and to facilitate adjustment.

I claim:

1. For a crawler truck having a truck frame and a tread roller, an adjustable mounting for the roller on the frame comprising cooperating screw and nut members one of which is adapted to react on the roller and the other on the frame and sleeves operatively associated respectively with the nut member and the screw member, arranged for relative telescopic movement in accordance with relative axial movement of said members and surrounding the threaded part of the screw member.

2. A construction according to claim 1 in which the sleeve associated with the nut member is formed as an internally threaded extension of the nut member cooperating with the screw member, and in which the sleeve associated with the screw member surrounds the other sleeve.

3. In a load handling machine having a crawler truck and a roller mounted on the truck and cooperating with the crawler tread; adjustable mounting mechanism for the roller including a shaft on which the roller is carried, a guideway for the shaft providing freedom for movement in a direction to take up slack in the tread, and adjustment means comprising complementary threaded screw and nut members one of which is adapted to react against the shaft and the other against the truck structure to move the shaft in the guideway, the nut member being closed at one end and being of sufficient axial dimension to provide the desired range of adjustment, without causing the screw member to abut the end-closure of the nut member.

4. In a load handling machine having a crawler truck and a roller mounted on the truck and cooperating with the crawler tread; adjustable mounting mechanism for the roller including a shaft on which the roller is carried, a guideway for the shaft providing freedom for movement in a direction to take up slack in the tread, and adjustment means comprising complementary threaded screw and nut members one of which is adapted to react against the shaft and the other against the truck structure to move the shaft in the guideway, the nut member being of extended axial dimension such as to provide the desired range of adjustment without causing the screw member to project beyond one end of the nut member, and a sleeve surrounding the screw member beyond the other end of the nut member.

5. A construction according to claim 4 in which said sleeve is mounted to move with the screw member and extends into telescopic relation with the nut member.

6. In a load handling machine having a crawler truck comprising a crawler tread and a cooperating tread roller mounted on the truck frame, adjustment mechanism for shifting the position of the roller with respect to the truck frame including cooperating screw and nut members adapted by reaction against the truck frame to move the roller with respect to the frame, the nut member being closed at one end to provide against ingress of dirt to the thread and being of extended axial dimension to provide the desired range of adjustment.

7. A construction according to claim 6 and further including a sleeve surrounding the screw member in the region where it enters the nut member, and the nut member being telescoped into said sleeve to provide against ingress of dirt.

8. For a crawler truck having a crawler tread and a cooperating tread roller mounted by a shaft, an adjustable mounting for the tread roller shaft comprising a movable block member carrying a threaded member, a second threaded member adjustably screwed on the first and adapted to react against an abutment, and a sleeve-like element on one of said members in telescopic relation to another of said members so as to peripherally enclose the otherwise exposed thread area of one of said threaded members irrespective of the extent of normal adjustment.

CECIL E. JONES.

REFERENCES CITED

The following references are of record in the file of this patent:

UNITED STATES PATENTS

| Number | Name | Date |
|---|---|---|
| 1,316,627 | McKenzie | Sept. 23, 1919 |
| 2,167,039 | Ekbom | July 25, 1939 |
| 2,284,821 | Heaslet | June 2, 1942 |